Oct. 27, 1925.

M. C. E. MULOT 1,558,750

SHOCK ABSORBING MEANS

Filed Oct. 13, 1922    2 Sheets-Sheet 1

Oct. 27, 1925. 1,558,750
M. C. E. MULOT
SHOCK ABSORBING MEANS
Filed Oct. 13, 1922 2 Sheets-Sheet 2
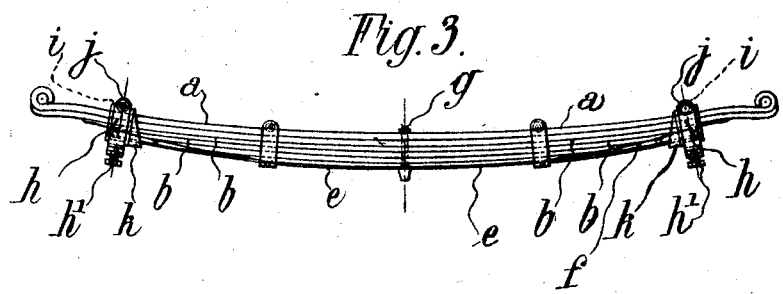
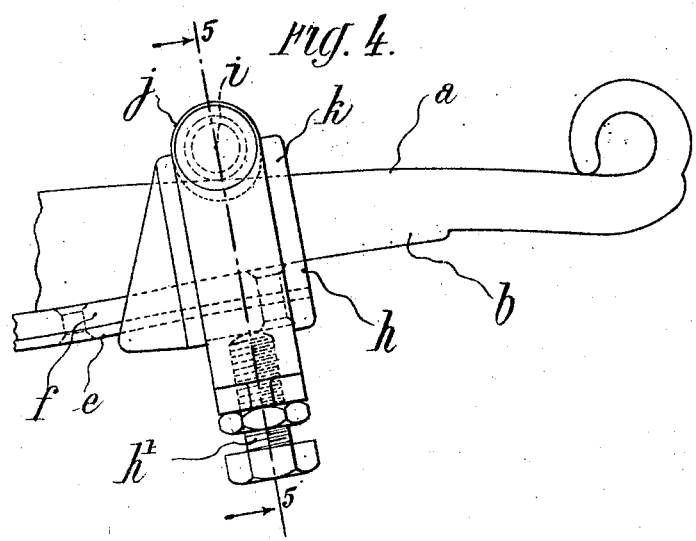
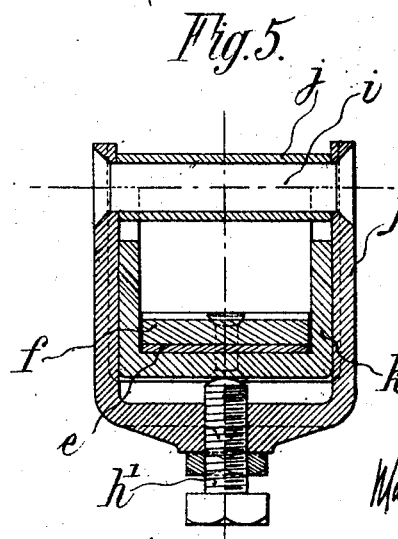

Patented Oct. 27, 1925.

1,558,750

UNITED STATES PATENT OFFICE.

MARCEL CHARLES ERNEST MULOT, OF PARIS, FRANCE.

SHOCK-ABSORBING MEANS.

Application filed October 13, 1922. Serial No. 594,232.

*To all whom it may concern:*

Be it known that I, MARCEL CHARLES ERNEST MULOT, a citizen of the French Republic, residing at Paris, France, have invented certain new and useful Improvements in Shock-Absorbing Means, of which the following is a specification.

This invention relates to shock absorbing means, or means for damping or restraining the relative movements of two oscillating bodies connected by resilient means.

The invention refers more particularly to shock absorbing means for use in connection with the suspension of vehicles, as it appears to possess the greatest advantages in this application, but it is not exclusively limited to this purpose.

The principal object of the invention is so to construct the shock absorbing means that, whilst being at least as efficient and durable as those at present in use, they are more simple in construction, less bulky, require less attention and are cheaper than the older constructions.

According to the invention, I employ laminated springs of the usual character for connecting the two bodies, and the essential feature of the invention consists in providing as the shock absorbing means, beyond the point of attachment of each spring, stirrup like devices attached either to the principal or master lamina or to a flexible band system applied along the edges of the laminæ, that is to say at the portion opposite the master lamina. These stirrups are so arranged that they bear on the outer surface of the whole device opposite to their point of attachment, with a pressure which is so determined that a proportionate damping or shock absorbing action takes place at the band system. Hence when the oscillating bodies have approached each other and tend to separate, the proportionate damping action is exerted, as the pressure of the stirrups reaches the maximum when the oscillating bodies have come to the position of rest.

The invention also comprises certain constructional details which are preferably utilized in combination, and which will be more fully described hereafter.

Further, it includes certain constructional embodiments and in particular a construction adapted for use in connection with vehicles.

In order that the invention may be clearly understood, I will now proceed to describe the same with reference to the accompanying drawings, but it is to be pointed out that the description and drawings are given merely by way of example.

Fig. 3 shows in side elevation one of the ends of a similar spring, the shock absorbing or damping means of which is provided by another embodiment of the invention.

Fig. 4 shows in side elevation the same shock absorbing means, the scale of the drawing being larger.

Fig. 5 is a section on 5—5 Fig. 4.

Figure 1:
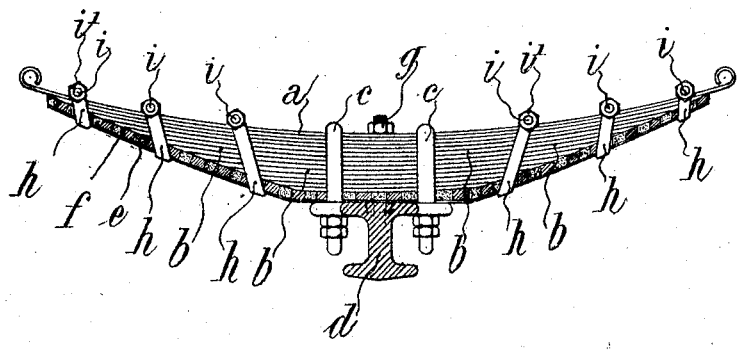
Fig. 1 shows in side elevation, with portions in section, a suspension spring of the lamina type for vehicles, carried by the axle thereof and provided with shock absorbing or damping means constructed according to one constructional form of the invention.

The drawing illustrates the applications of the invention to the front portion of a vehicle for the purpose of restraining the oscillations of the suspended portion, and the construction is substantially as follows:—

As regards the vehicle itself, apart from the suspension system and shock absorbing means, this may be of any ordinary construction.

As regards the suspension and shock absorbing means, these are combined, as has already been proposed, but the particular means or method of combining them is more advantageous and more efficient than has previously been the case.

The suspension system consists of laminated springs, which may be of the usual type, and are of appropriate dimensions for carrying the suspended portions of the vehicle.

Each of these springs comprises, in the customary manner, a principal or master lamina $a$, other or ordinary laminæ $b$, and retaining stirrups or straps $c$, by means of which the springs are attached to the corresponding axle $d$ of the vehicle.

It is assumed, in what follows, that the parts are of the usual type, as shown in the drawing, but it is to be understood that the invention is applicable to other arrangements of laminated springs.

In constructing the shock absorbing arrangement, according to the invention, I provide a flexible band e, which may be advantageously associated with another band f of bendable and compressible material, attached thereto. The materials should have considerable resistance and a high co-efficient of friction. The material generally known as "ferrodo" is suitable for the band f as such material is bendable and slightly compressible. This ferrodo is a combination of asbestos and metal wire or gauze, and it is slightly compressible.

The whole device consisting of the resilient and compressible bands is adapted to be attached by means of bands of "ferrodo" along the lower portion of the laminated spring, and is held at the centre by the bolt g, which is the usual bolt for attaching together the various laminæ of the spring.

Figure 2:
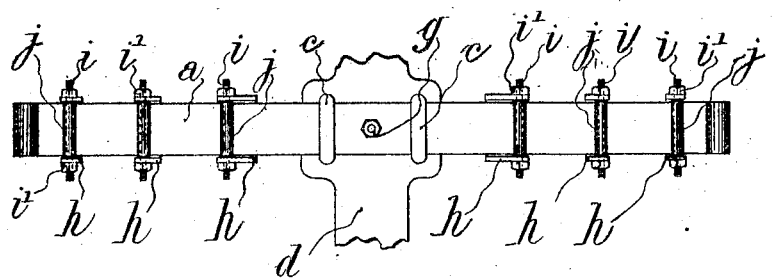
Fig. 2 is a partial plan view of the said device.

I also provide an appropriate number of stirrup shaped fittings. These may, for instance, consist of U shaped pieces h, the ends of which are connected together by a system of bars. Thus the ends of each stirrup h may be connected by a cylindrical rod i preferably inserted into a roller j which can turn around its own axis. Each rod i may be permanently connected as shown in Figs. 4 and 5 or it may be removable. For this purpose it can be, as shown in Figs. 1 and 2, externally threaded at its ends and held in place in the arms of the U shaped fittings by nuts i¹ screwed on to the ends.

Each of these fittings is so constructed that it may be connected to the spring by attaching it to the outer face of the band e, of the inner face of the middle portion. In the embodiment shown in Figs. 1 and 2 the middle part of each fitting or stirrup is connected to band e. In the embodiment shown in Figs. 4 and 5, each stirrup h has an inner bracket or guide k which is adjustable and is held and clamped in position by set-screw h'. It is to be noted that stirrups h are inclined to the laminæ, but this is not essential.

If the parts are in proper position, the fittings h (Figs. 1 and 2) or the brackets k (Figs. 3 to 5) embrace, without lateral friction, the corresponding portion of the spring. The arrangement is such that when the springs are placed in position in the vehicle and the system is in a state of rest, the said devices exert pressure on the outer surface of the master spring. This produces substantial friction between the laminæ of the springs. As shown in Figs. 3 and 4 the compressible member f may be located only on the outer parts of the lamina e, and the compressible member may taper from the outer portion of said lamina toward the central part of the spring. This construction could be readily secured by providing a supplemental blade or lamina for the end of the spring, to which the compressible band could be connected, irrespective of the position of the stirrups h. As shown in Fig. 3, the ends of the secondary laminæ may form a continuous tapering line. The "ferrodo" of which the compressible member e is made is an asbestos and wire fabric.

It will be noted that the spring, if it is considered as being composed of all the blades or laminæ is of greatest thickness at the middle portion thereof. Each half of the spring may be considered as having a wedge shape.

It will also be noted that if the axle d is moved away from the body of the vehicle, as for example when the downward slope of a depression in the road is encountered that the roller i of each stirrup h tends to have a relative inward movement with respect to the master lamina a. The effect is the same as though it were attempted to force a greater cross-section of the wedge shaped spring through each stirrup h. The result of this is to compress the compressible band f, thereby causing a very rapidly growing elastic reaction, and increasing the pressure between the laminæ of the spring. Thus a very rapidly increasing braking effect is realized which damps or restrains the oscillations of the spring towards the unloaded position, which is very desirable. When the vehicle encounters the upward slope of a depression or a rise in the road, then each lamina and the band e are bent so as to correspond to a position of increased load. Then the free end of each stirrup h travels outwards that is, away from the axle d. Hence its roller i travels outwardly so as to decrease the cross-section of the spring passing through the stirrups whereby the pressure between the laminæ is lessened. The rollers i may even lose contact with the master lamina a. The result of this is in any case to decrease the pressure between the various laminæ of the spring so that no damping effect exists on this occasion, which is desirable. However, upon the rebound which usually occurs when the body of the vehicle tends to move upwardly too far with respect to the axle, the braking or damping effect is again gradually applied, thus braking said rebound. As before stated, when the spring is in its normal position the parts are so arranged that the rollers i are forced against the lamina a with substantial pressure. Each stirrup h is firmly connected to the band e by some permanent means, as in the embodiments shown in Figs. 1 to 5, and the initial pressure or compression of the compressible band may be regulated by a set screw $h^1$ as shown in Figs. 3-5. Of course, this pressure could be regulated by means equivalent to a set screw, such as a spring or other suitable means. When the spring is bent, the stirrup $h$ is not free to turn with respect to that portion of the bottom of the spring which is directly adjacent thereto, and hence it may be stated that the stirrup $h$ is rigidly fastened to the adjacent portion of the band $e$ so that when the curvature of the band $e$ is increased, the free ends of each of the stirrups $h$ connected thereto are compelled to move inwardly, that is, towards the axle $d$.

I have shown a preferred embodiment of my invention but it is clear that numerous changes and omissions could be made without departing from its spirit.

It will be noted that each stirrup together with its roller forms in effect an annular member connected to the spring and adapted to embrace the wedge shaped system of laminæ thereof and to cause said laminæ to be pressed together when the said spring is in its normal position, and that a part of the said annular member is so connected to the spring system that its free end is adapted to partake of an inward movement when the spring is distended. The somewhat compressible element (ferrodo) may taper from the outward end of the band $e$ to the center thereof, this case being shown in Figures 3 and 4.

It is obvious that one or more of the stirrups $h$ can be employed in combination with the spring.

The position of the springs when the body of vehicle is mounted upon the springs of the chassis and the car is stationary or traveling on a smooth road, may be considered as the position of normal load.

I claim :—

1. A leaf spring comprising a series of laminæ of different lengths, means for holding said laminæ together, said laminæ being so arranged that said spring has a portion of a wedge shape, the said spring including a relatively compressible portion and annular means connected to the said spring and adapted to embrace the laminæ thereof and to press them together, the said annular means being inclined to the longitudinal axis of the said spring when the said spring is in its normal position and being so connected to the said spring that said means are adapted to partake of a turning movement when the said spring is distorted from its normal position, said annular means being adapted to increase the compression of said compressible portion when their angle to the longitudinal axis of said spring is increased, said annular means being rigidly connected to the lower part of said spring.

2. In combination with a leaf spring having a series of laminæ, pressure means adapted to cause the said laminæ to be pressed together so as to produce a frictional effect, the said pressure means being adapted to cause the pressure with which the said leaves are pressed together to vary with the curvature of the said leaves, said pressure means being rigidly connected to the lower part of said spring.

3. A device according to claim 2 in which a bendable and compressible member forms part of the spring structure.

4. A device according to claim 2 in which the force with which the said leaves are pressed together is adapted to be diminished as the curvature of the laminæ is diminished, and to increase as the curvature of the laminæ is increased.

5. In combination with a leaf spring having a series of laminæ of varying length so that said spring has a relatively thick portion and a relatively thin portion, a series of turnable pressure members adapted to cause the said laminæ to be pressed together and produce a frictional effect, the said pressure members being inclined towards the thin portion of the said spring, when the said spring is in normal position, said pressure members being rigidly connected to the lower part of said spring.

6. In combination with a leaf spring having a series of laminæ of varying length so that said spring has a relatively thick portion and a relatively thin portion, a bendable and compressible member associated with the said laminæ, a series of turnable pressure members connected to the said spring, the said pressure members being adapted to force the said laminæ against each other to produce a frictional effect, the said pressure members being of such contour that the said compressible member is under compression when the spring is in its normal position whereby the said pressure members then act to press the said laminæ against each other, the said pressure members being inclined away from the relatively thick portion of the spring and being rigidly connected to the lower part of said spring.

7. In combination with a leaf spring having a series of laminæ, an outer member adapted to encircle said spring at a portion thereof, and rigidly connected to the lower part of said springs, an inner movable member mounted on said outer member, and means adapted to relatively actuate said members.

8. In combination with a leaf spring having a series of laminæ, an outer member adapted to encircle said spring at a portion thereof, an inner movable member mounted within said outer member, the bottom of said inner movable member being adapted to contact with the bottom of the said spring, and means adapted to move said inner member with respect to said outer member so as to clamp the said outer member against the said inner member and to clamp the said inner member against the bottom of the said spring, the top of the said outer member being then adapted to contact with the top of the said spring.

9. In combination with a leaf spring having a series of laminæ, an outer stirrup member adapted to encircle said spring at a portion thereof, an inner member movably mounted in said outer member, and a set screw operatively connected with said outer member and having its point adapted to abut said inner member.

10. In combination with a leaf spring having a series of laminæ, said laminæ being so arranged that said spring has a portion of a wedge-shape, a friction strip located at the bottom of the said laminæ and a plurality of annular pressure members having their bottoms rigidly connected to the said strip and having their tops adapted to contact with the top of the said spring, the said annular members being inclined away from the thickest portion of the said spring.

11. A leaf spring comprising a series of laminæ of different lengths, a friction strip forming part of the said spring, means for holding the said laminæ and said friction strip together, the said laminæ being so arranged that said spring has a portion of a wedge-shape, and a plurality of annular compression members connected to the said spring and adapted to embrace the laminæ thereof and to press them together and to compress the said friction strip, the said annular compression members being inclined to the longitudinal axis of the said spring and away from the thickest portion thereof when the said spring is in its normal position and being rigidly connected to the lower part of the said spring, the said annular compression members being of such dimensions that they are adapted to compress the said strip when the spring is in its normal position.

In testimony whereof I have hereunto set my hand.

MARCEL CHARLES ERNEST MULOT.